No. 804,036. PATENTED NOV. 7, 1905.
J. B. PETERS.
POTATO DIGGER.
APPLICATION FILED OCT. 28, 1904.

2 SHEETS—SHEET 1.

Fig. I.

Witnesses
E. H. Reichenbach
H. M. Baldwin

Inventor
J. B. Peters.
by
Attorneys

No. 804,036. PATENTED NOV. 7, 1905.
J. B. PETERS.
POTATO DIGGER.
APPLICATION FILED OCT. 28, 1904.

2 SHEETS—SHEET 2.

Witnesses
C. K. Reichenbach.
H. M. Baldwin.

Inventor
J. B. Peters.
by
Attorneys

UNITED STATES PATENT OFFICE.

JAMES B. PETERS, OF DARRAGH, MICHIGAN.

POTATO-DIGGER.

No. 804,036.  Specification of Letters Patent.  Patented Nov. 7, 1905.

Application filed October 28, 1904. Serial No. 230,342.

*To all whom it may concern:*

Be it known that I, JAMES B. PETERS, a citizen of the United States, residing at Darragh, in the county of Kalkaska, State of Michigan, have invented certain new and useful Improvements in Potato-Diggers; and I do hereby declare the following to be a full, clear, and exact description of the invention, such as will enable others skilled in the art to which it appertains to make and use the same.

This invention relates to farm implements, and more particularly to potato-diggers, and has for its object to provide an implement which will dig the potatoes from the ground, remove all dirt and other undesirable matter therefrom, and deposit them in a hopper.

A further object is to provide a construction in which the depth to which the plow enters the ground may be varied and in which the pole is so arranged that the implement may be kept in its course with little or no difficulty.

Other objects and advantages will be apparent from the following description, and it will be understood that modifications of the specific construction shown may be made and any suitable materials may be used without departing from the spirit of the invention.

Figure 1:
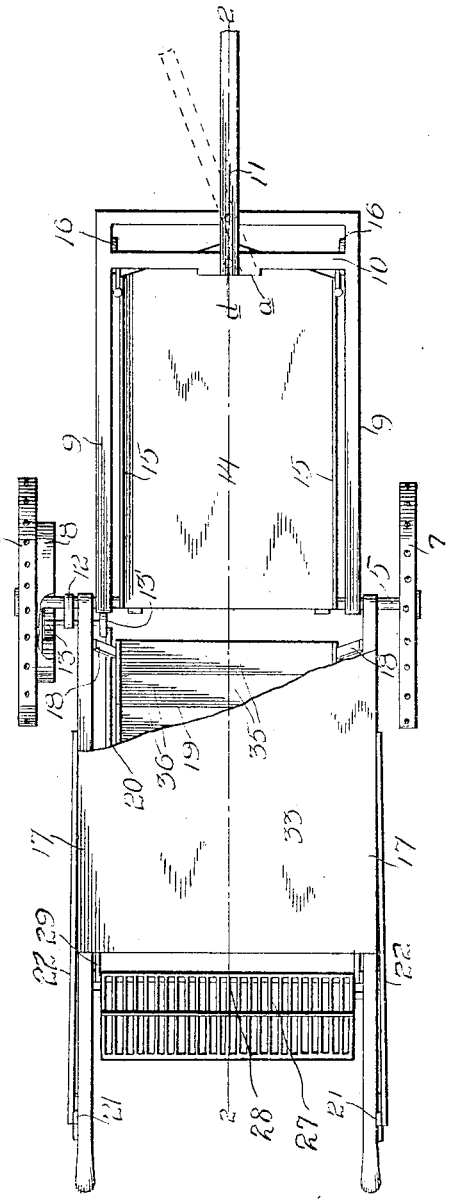
Figure 2:
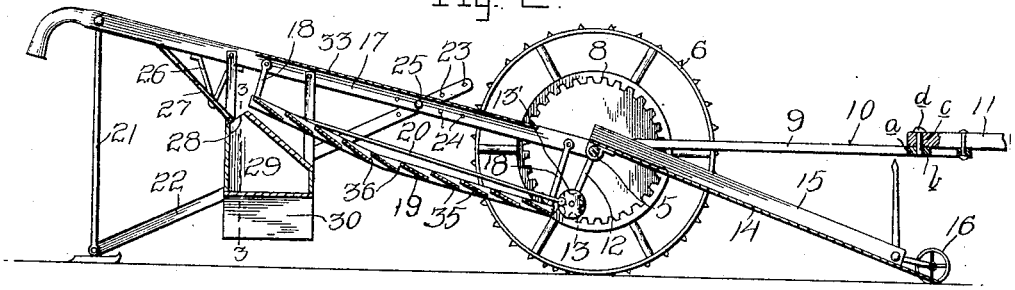
Figure 3:
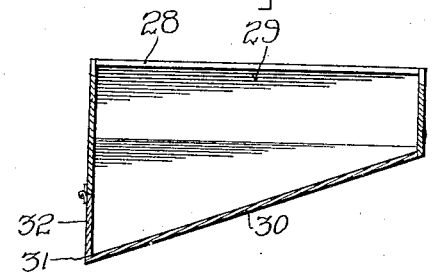

In the drawings forming a portion of this specification, and in which like characters of reference indicate similar parts in the several views, Figure 1 is a top plan view of the implement. Fig. 2 is a section on line 2 2 of Fig. 1. Fig. 3 is a sectional view of the hopper, taken on line 3 3 of Fig. 2.

Referring now to the drawings, the present invention comprises an axle 5, upon the ends of which are mounted wheels 6 and 7, the former carrying an internal gear 8 for a purpose to be presently described. Pivotally engaged with the axle 5 are the rearward ends of forwardly-extending side portions 9 of a frame 10, to the forward end of which there is pivoted a draft-pole 11, the pivoting of this pole permitting the implement to be easily guided and kept in its course along a potato-row.

Depending from the axle 5 adjacent to the wheel 6 is a hanger 12, at the lower end of which there is revolubly mounted a pinion 13, which meshes with the gear 8.

Pivotally connected with the axle 5 and resting thereupon is the rearward end of a plow-blade 14, having vertical sides 15, and at its forward end this plow-blade is provided with adjustable colter-wheels 16, by which the distance to which the plow penetrates the ground may be varied.

Connected at their forward ends with the axle 5 are two rearwardly-extending handles 17, to which there are pivoted pairs of spaced depending hangers 18, the hangers of one handle coinciding with those of the other. The forward hangers 18 are somewhat longer than the rearward hangers, and pivoted at its corners to the lower ends of these hangers there is a vibrator 19, which is thus inclined upwardly and rearwardly, and this vibrator is disposed to receive matter discharged from the rearward end of the plow-blade 14.

Pivoted at its rearward end to the rearward end of the vibrator is a pitman 20, which is pivoted to the pinion 13 eccentrically at its forward end.

Pivoted at its upper end between the rearward ends of the handle 17 is a support 21, and pivoted to the lower end of this support is a forwardly-extending rod 22, which is inclined upwardly and has a plurality of perforations 23 adjacent to its forward end and arranged in a line longitudinally of the rod, and these perforations are arranged for interchangeable registration with a longitudinal series of perforations 24, formed through one of the handles 17 for the reception of a pin 25, and it will thus be seen that the support 21 may be moved pivotally to vary the position of the rearward ends of the handles. Depending from the handles 17, adjacent to their rearward ends, are a pair of brackets 26, between which there is secured a grating 27, which slants slightly downwardly and forwardly and lies with its lower edge above the opening 28 of a hopper 29, this grating being arranged to receive thereagainst matter thrown from the rearward end of the vibrator and to direct it into the hopper. The opening 28 is at the rearward edge of the hopper, and the top 29 slants downwardly and forwardly from the opening, so that any matter falling thereupon will slip off to the ground. The bottom 30 of the hopper slants toward one side, and at the lower edge of this side there is an opening 31, provided with a door 32, this arrangement making it easy to remove the contents of the hopper.

The vibrator consists of a plurality of slanting flights 35, which are spaced from each other at their edges, so that there are formed, in effect, steps 36, which are directed toward the rearward end of the vibrator.

It will thus be apparent that as the implement is moved along a potato-row the potato will be dug up by the blade 14 and will fall from the rearward end thereof upon the vibrator 19, the movement of the latter transferring them from step to step thereof until they are thrown from its rearward end against the grating 27, from which they pass into the hopper 28, the dirt and other matter being separated from the potatoes during their passage and falling between the flights of the vibrator and through the grating. A suitable cover 33 is provided for the vibrator, as illustrated.

The rearward end of the draft-pole moves over a plate $a$, carried by the frame, and this plate is provided with a perforation $b$, with which may be registered a perforation $c$ in the rearward end of the pole for the reception of a pin $d$ to hold the pole against movement when the implement is to be transferred from place to place.

What is claimed is—

1. A mechanism of the class described comprising a wheeled frame including handles, a plow-blade having one of its ends pivotally secured to the axle of the frame, a vibrator disposed in the rear of the plow-blade with one of its ends immediately beneath the pivoted end of the said blade, a hopper disposed at the rear end of the vibrator and immediately therebeneath, and a grating connected to the hopper and the aforesaid handles, the grating being arranged upon an incline.

2. A mechanism of the class described comprising a wheeled frame including handles, a plow-blade having one of its ends secured to the axle of the wheeled frame, a vibrator suspended from said handles in the rear of the plow-blade, a hopper suspended from the handles and disposed beneath one end of the vibrator, and a grating connected to the hopper and the handles.

3. A mechanism of the class described, comprising a wheeled frame including handles, a plow-blade secured at one of its ends to the axle of the wheeled frame, and depending therefrom, a vibrator suspended from the handles in the rear of said blade, a hopper suspended from the handles and disposed beneath one end of the vibrator, a grating connected to the handles and the hopper, the grating being arranged upon an incline, and means constructed and arranged to vary the position of the plow-blade.

In testimony whereof I affix my signature in presence of two witnesses.

JAMES B. PETERS.

Witnesses:
C. L. BAILEY,
JESS WISLER.